United States Patent
Lin et al.

(10) Patent No.: US 10,600,230 B2
(45) Date of Patent: Mar. 24, 2020

(54) MESH RENDERING SYSTEM, MESH RENDERING METHOD AND NON-TRANSITORY COMPUTER READABLE MEDIUM

(71) Applicants: Sheng-Yen Lin, Hsinchu (TW);
Sheng-Wei Lin, Hsinchu (TW);
Ching-Tung Lin, Hsinchu (TW);
Jui-Fen Ho, Hsinchu (TW)

(72) Inventors: Sheng-Yen Lin, Hsinchu (TW);
Sheng-Wei Lin, Hsinchu (TW);
Ching-Tung Lin, Hsinchu (TW);
Jui-Fen Ho, Hsinchu (TW)

(*) Notice: Subject to any disclaimer, the term of this patent is extended or adjusted under 35 U.S.C. 154(b) by 8 days.

(21) Appl. No.: 16/100,223

(22) Filed: Aug. 10, 2018

(65) Prior Publication Data
US 2020/0051308 A1    Feb. 13, 2020

(51) Int. Cl.
*G06T 13/20* (2011.01)
*G06T 15/00* (2011.01)

(52) U.S. Cl.
CPC ............ *G06T 15/005* (2013.01); *G06T 13/20* (2013.01); *G06T 2210/16* (2013.01); *G06T 2210/21* (2013.01)

(58) Field of Classification Search
CPC .............................. G06T 15/005; G06T 13/20
See application file for complete search history.

(56) References Cited

U.S. PATENT DOCUMENTS

| | | | |
|---|---|---|---|
| 8,831,919 B2 | 9/2014 | Kavan et al. | |
| 9,378,579 B1 | 6/2016 | Child | |
| 9,519,988 B2 | 12/2016 | Sumner et al. | |
| 9,659,396 B1 | 5/2017 | Chang et al. | |
| 9,842,411 B2 | 12/2017 | Milne et al. | |
| 2011/0298897 A1* | 12/2011 | Sareen | G06N 3/006 348/47 |
| 2015/0278155 A1* | 10/2015 | Myers | G06F 17/15 382/203 |
| 2017/0046865 A1* | 2/2017 | Cantwell | G06T 13/40 |
| 2017/0161948 A1* | 6/2017 | Hua | G06T 17/205 |
| 2017/0372504 A1* | 12/2017 | Jang | G06T 13/40 |
| 2019/0012840 A1* | 1/2019 | Finman | G06T 19/006 |

FOREIGN PATENT DOCUMENTS

| | | |
|---|---|---|
| CN | 107093200 | 8/2017 |
| TW | 200715137 | 4/2007 |
| TW | 200841736 | 10/2008 |

\* cited by examiner

*Primary Examiner* — Jitesh Patel
(74) *Attorney, Agent, or Firm* — JCIPRNET (57) ABSTRACT

A mesh rendering system, a mesh rendering method and a non-transitory computer readable medium are provided. The mesh rendering system includes a database, a user device and a server. The server obtains preprocessing data of a cloth and a rigidbody according to initial mesh state of the cloth, initial mesh state of the rigidbody and motion of the rigidbody, wherein the cloth and the rigidbody are deformable and motion of the cloth corresponding to the motion of the rigidbody is a small deformation. The server stores the preprocessing data in the database. A finite state machine of the server receives a real-time input data from the user device through a web service and the preprocessing data, and the finite state machine outputs a deformation result of the cloth and the rigidbody to the user device through a handshake mechanism.

20 Claims, 12 Drawing Sheets

MESH RENDERING SYSTEM, MESH RENDERING METHOD AND NON-TRANSITORY COMPUTER READABLE MEDIUM

BACKGROUND

Technical Field

The invention relates to a mesh rendering system, a mesh rendering method and a non-transitory computer readable medium, and more particularly, to a mesh rendering system, mesh rendering method and non-transitory computer readable medium that improves the smoothness of deformation of cloth during high poly mesh rendering.

Description of Related Art

Object interaction in multi-dimension space has become popular in recent years. To provide a better user experience, exquisite object detail is displayed. For example, high poly mesh rendering technique may be used to enhance the visual effect such as the color and the shade of the object, and the vertex system details. Furthermore, texture rendering may be performed along with high poly mesh information (i.e., corresponding relationship of two dimensional texture space) and described by images with detailed information to enhance the exquisiteness of the object. However, the computation cost of high poly mesh deforming and rendering technique is high and the displayed object may not be smooth enough due to poor connection quality or low computation ability of the user device.

To provide object interaction with the user, WEB service and Mobile APP service are developed. Mobile APP service has been massively designed for its direct binding to the hardware device therefore providing a better user experience. However, Mobile APP service can mostly be executed on a specific platform. On the other hand, WEB service has the advantage of cross-platform execution so it can be executed under different devices or operating systems. Therefore, utilizing the WEB service to provide object interaction service while maintaining a decent displaying quality of the object is one of the major objectives for those skilled in the art.

SUMMARY

Accordingly, the invention provides a mesh rendering system, a mesh rendering method and a non-transitory computer readable medium to improve the smoothness of deformation of cloth during high poly mesh rendering.

The invention provides a mesh rendering system, comprising: a database; a user device; and a server, coupled to the database and the user device, wherein the server obtains preprocessing data of a cloth and a rigidbody according to mesh state of the cloth, mesh state of the rigidbody and motion of the rigidbody, wherein the cloth and the rigidbody are deformable and motion of the cloth corresponding to the motion of the rigidbody is a small deformation, wherein the mesh state includes a plurality of particle information of the cloth and the rigidbody; the server stores the preprocessing data in the database; and a finite state machine (FSM) of the server receives a real-time input data from the user device through a web service and the preprocessing data, and the finite state machine outputs a deformation result of the cloth and the rigidbody to the user device through a handshake mechanism.

The invention provides a mesh rendering method, comprising: obtaining preprocessing data of a cloth and a rigidbody according to mesh state of the cloth, mesh state of the rigidbody and motion of the rigidbody, wherein the cloth and the rigidbody are deformable and motion of the cloth corresponding to the motion of the rigidbody is a small deformation, wherein the mesh state includes a plurality of particle information of the cloth and the rigidbody; storing the preprocessing data in the database; and receiving a real-time input data from the user device through a web service and the preprocessing data, and outputs a deformation result of the cloth and the rigidbody to the user device through a handshake mechanism.

The invention provides a non-transitory computer readable medium, storing a program causing a mesh rendering system to execute a process, the process comprising: obtaining preprocessing data of a cloth and a rigidbody according to mesh state of the cloth, mesh state of the rigidbody and motion of the rigidbody, wherein the cloth and the rigidbody are deformable and motion of the cloth corresponding to the motion of the rigidbody is a small deformation, wherein the mesh state includes a plurality of particle information of the cloth and the rigidbody; storing the preprocessing data in the database; and receiving a real-time input data from the user device through a web service and the preprocessing data, and outputs a deformation result of the cloth and the rigidbody to the user device through a handshake mechanism.

Based on the above, the mesh rendering system, the mesh rendering method and the non-transitory computer readable medium of the present invention obtains the preprocessing data of a cloth and a rigidbody and stores the preprocessing data in the database. When a real-time input data of the user is received by the server, the server also receives the preprocessing data in the database to output a deformation result of the cloth and the rigidbody to the user device. Therefore, the computation cost of the user device is reduced and the user experience is improved accordingly.

To make the aforementioned feature more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
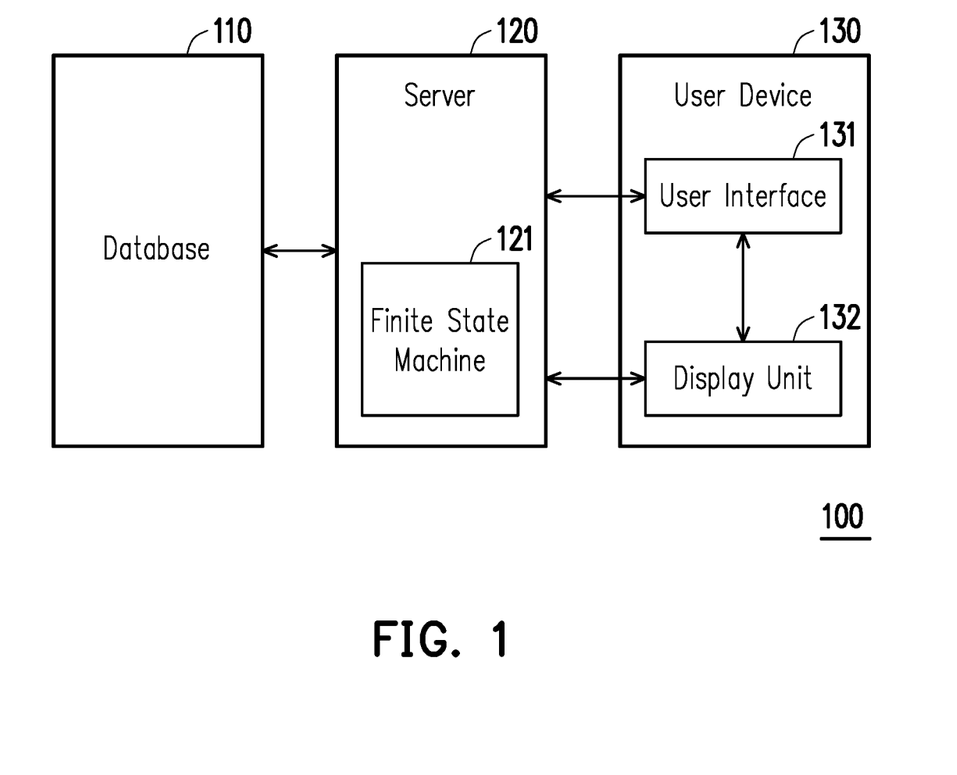
FIG. 1 is a block diagram of the mesh rendering system according to an embodiment of the invention.

FIG. 1 is a block diagram of the mesh rendering system according to an embodiment of the invention.

Referring to FIG. 1, the mesh rendering system includes database 110, a server 120 and a user device 130. The server 120 couples to the database 110 and the user device 130. The user device 130 may be a smartphone, a tablet, a pad, or the like. The user device 130 includes a user interface 131 and a display unit 132. A user may input the data corresponding to movement or deformation of cloth or rigidbody through the user interface 131 to the finite state machine (FSM) 121 of the server 120 and after the server 120 receives preprocessing data from the database 110, the server may 120 transmit a rendering information back to the display unit 132 in response.

In an embodiment, the server 130 obtains preprocessing data of a cloth and a rigidbody according to initial mesh state of the cloth, initial mesh state of the rigidbody and motion of the rigidbody, and stores the preprocessing data in the database 110. When the FSM 121 receives a real-time input data from the user device 130 through a web service, the FSM 121 outputs a deformation result of the cloth and the rigidbody to the user device 130 according to the real-time input data and the preprocessing data. It should be noted that the cloth and the rigidbody are deformable and motion of the cloth corresponding to the motion of the rigidbody is a small deformation. The definition of the small deformation will be explained hereinafter. Moreover, the initial mesh state includes a plurality of particle information of the cloth and the rigidbody. The particle information includes vertex information, edge information and face information of the cloth and the rigidbody. Input data, comprising rigidbody input information, cloth input information and motion input information, represents user-defined preference to trigger the FSM to start the handshake mechanism which generates the desired result for the interactive purpose. In addition, the handshake mechanism includes some major processes such as Rigidbody Deformation Process, Cloth Item Deformation Process and Collision Detection Process. The major processes of FSM connects Preprocessing Database, Preprocessing Storage and Display Unit with each other back and forth in a specific order. Rigidbody input information includes the type and material of rigidbody. Rigidbody type includes mesh states and shaping selection. Cloth input information includes the type and material of cloth. The material of rigidbody and cloth includes the color and textures. Motion input information includes one or more displacements of rigidbody on the basis of mesh states and particle information. The major processes of the handshake mechanism will be described hereinafter.

In another embodiment, the process of obtaining the preprocessing data and stores the preprocessing data in the database 110 may be performed by a back-end server (not illustrated in FIG. 1) including the database 110 instead of performed by the server 120 (i.e., a front-end server directly coupled to the user device 130).

In an embodiment, the motion of the cloth is a small deformation when a value of a deformation function $R(a_j, b_j, c_j)$ is less than a threshold, wherein $a_j=U_{cloth}/U_j^{contact}$, $b_j=1/U_j^{stress}$. $U_{cloth}$ is a number of total mesh face of the cloth. $U_j^{contact}$ is a number of mesh faces of a contact area where the cloth contacting the rigidbody. $U_j^{stress}$ is a number of mesh faces of an edge of the cloth wherein the edge is parallel to a displacement direction of the rigidbody. $c_j$ is an absolute value of a displacement which is generated by the isotropic motion of the rigidbody. $j=1, 2, \ldots, J$ is a number of displacement. The value of the deformation function $R(a_j, b_j, c_j)$ is positively proportional to $a_j$, $b_j$ and $c_j$.

Figure 2A:
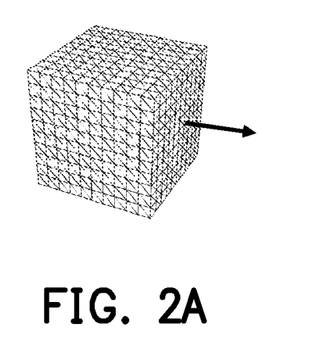
FIG. 2A-2D are diagrams illustrating deformation of the cloth caused by deformation of the rigidbody according to an embodiment of the invention.
Figure 2B:
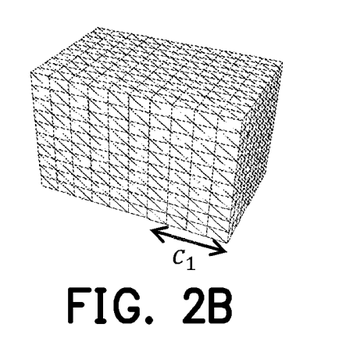
Figure 2C:
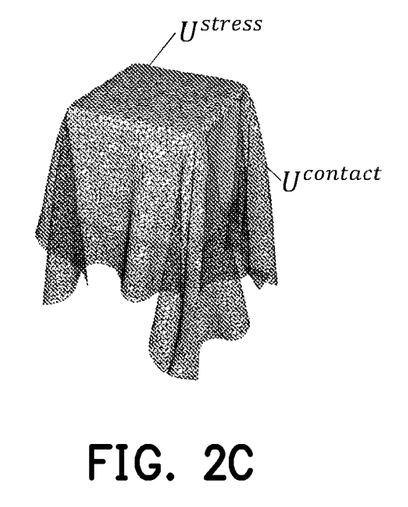
Figure 2D:
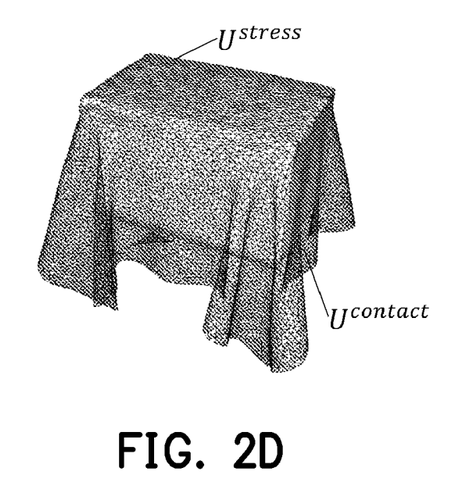

In an embodiment, FIG. 2A illustrates a rigidbody with one displacement. FIG. 2B illustrates the rigidbody with a displacement $c_1$. FIG. 2C illustrates a cloth covered on the rigidbody before deformation. FIG. 2D illustrates deformation of the cloth corresponding to the displacement $c_1$.

Figure 3A:
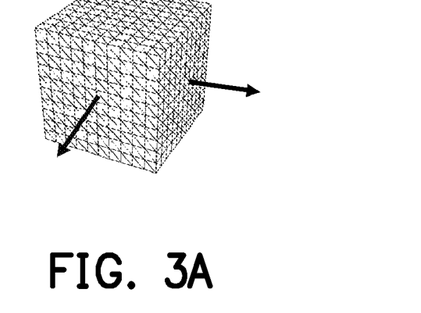
FIG. 3A-3D are diagrams illustrating deformation of the cloth caused by deformation of the rigidbody according to an embodiment of the invention.
Figure 3B:
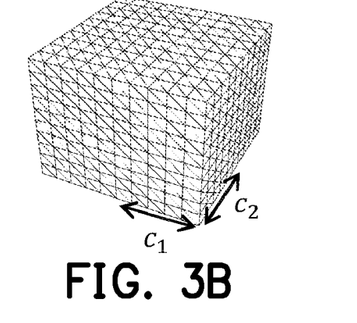
Figure 3C:
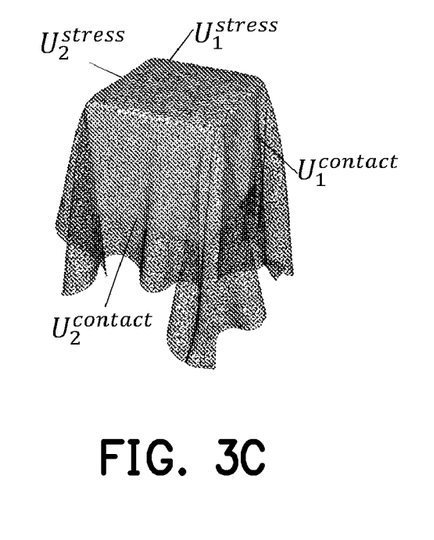
Figure 3D:
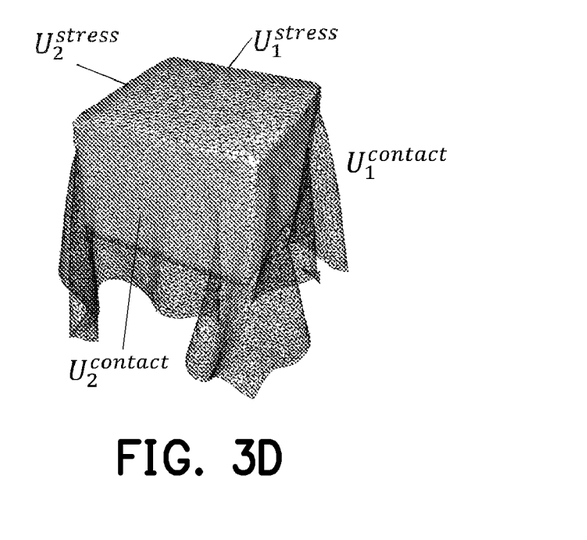

In an embodiment, FIG. 3A illustrate a rigidbody with two displacements (i.e., J=2). FIG. 3B illustrates the rigidbody with displacements $c_1$ and $c_2$. FIG. 3C illustrates a cloth covered on the rigidbody before deformation. FIG. 3D illustrates deformation of the cloth corresponding to the displacements $c_1$ and $c_2$.

Figure 4A:
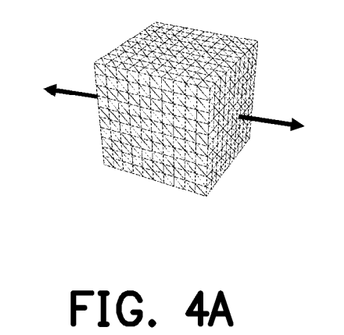
FIG. 4A-4D are diagrams illustrating deformation of the cloth caused by deformation of the rigidbody according to an embodiment of the invention.
Figure 4B:
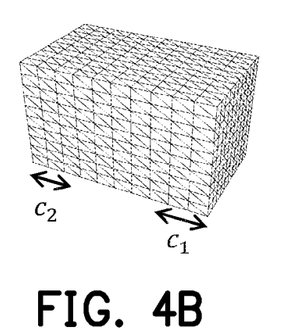
Figures 4C, 4D:
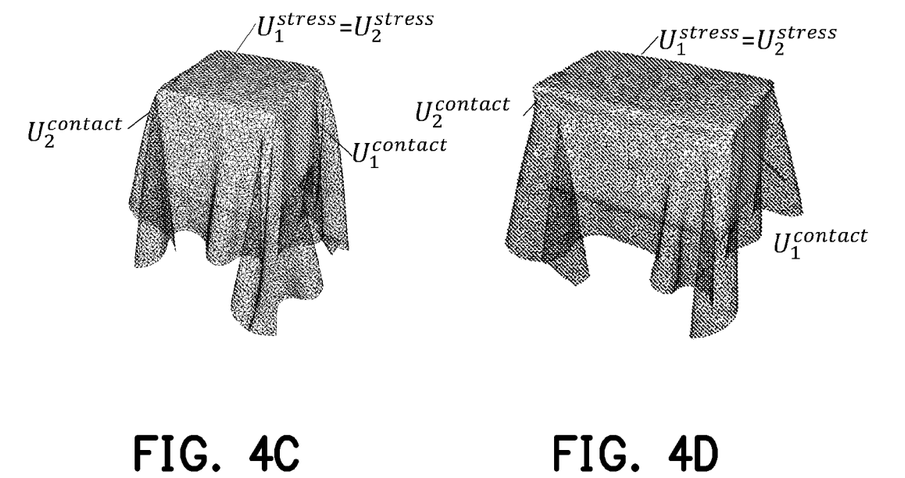

In an embodiment, FIG. 4A illustrates a rigidbody with two displacements (i.e., J=2). FIG. 4B illustrates the rigidbody with two displacements $c_1$ and $c_2$. FIG. 4C illustrates a cloth covered on the rigidbody before deformation. FIG. 4D illustrate deformation of the cloth corresponding to the displacements $c_1$ and $c_2$. Since the displacements $c_1$ and $c_2$ are parallel and in opposite direction, $U_1^{stress}$ equals to $U_2^{stress}$.

Figure 5A:
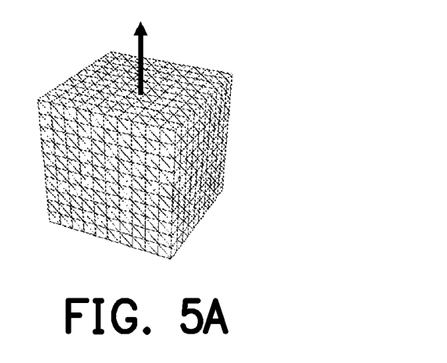
FIG. 5A-5D are diagrams illustrating deformation of the cloth caused by deformation of the rigidbody according to an embodiment of the invention.
Figure 5B:
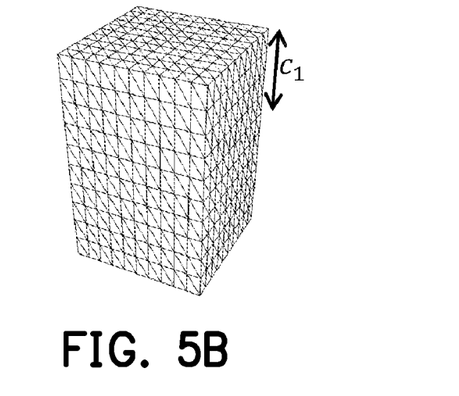
Figure 5C:
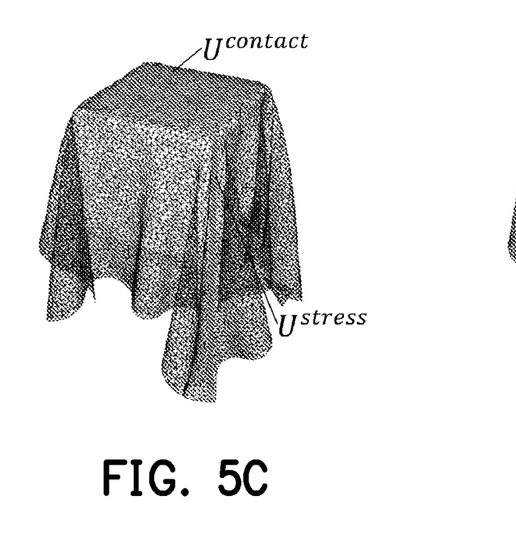
Figure 5D:
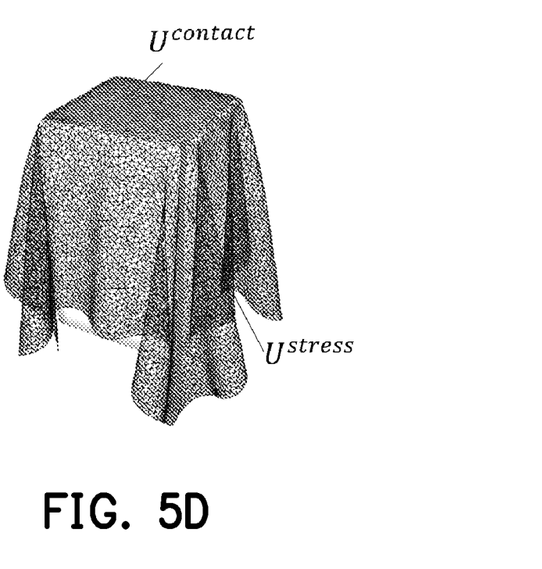

In an embodiment, FIG. 5A illustrates a rigidbody with one displacement. FIG. 5B illustrates the rigidbody with a displacement $c_1$. FIG. 5C illustrates a cloth covered on the rigidbody before deformation. FIG. 5D illustrates deformation of the cloth corresponding to the displacement $c_1$.

Figure 6A:
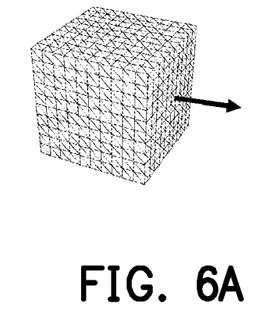
FIG. 6A-6D are diagrams illustrating deformation of the cloth caused by deformation of the rigidbody according to an embodiment of the invention.
Figure 6B:
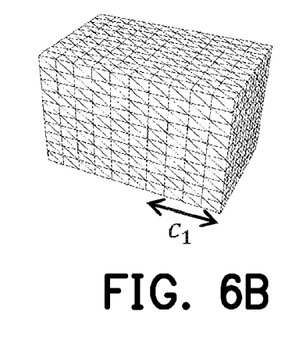
Figure 6C:
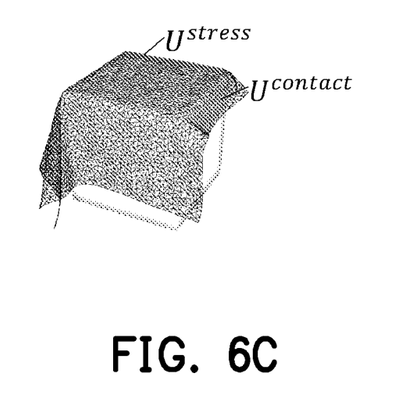
Figure 6D:
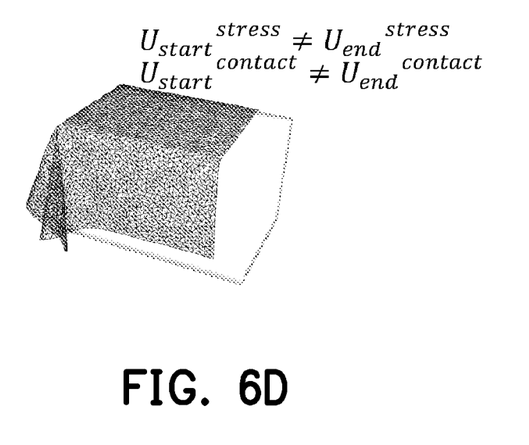

In an embodiment, FIG. 6A illustrates a rigidbody with one displacement. FIG. 6B illustrates the rigidbody with a displacement $c_1$. FIG. 6C illustrates a cloth covered on the rigidbody before deformation. FIG. 6D illustrates deformation of the cloth corresponding to the displacement $c_1$. Since the number of mesh face of the edge length of the displacement area are different before and after deformation (i.e., $U_{start}^{stress} \neq U_{end}^{stress}$) and the number of mesh face of the contact area are different before and after deformation (i.e., $U_{start}^{contact} \neq U_{end}^{contact}$), $R_{start}(a_1,b_1,c_1)$ and $R_{end}(a_1,b_1,c_1)$ therefore do not belong to the small deformation.

The server 120 may conclude the types of the rigidbody according to the user experience and the design choices, and defines the representative mesh states as inflection point states. Therefore, through the linear combination of the inflection points of multiple rigidbody, more descriptions of relationship between rigidbody types and particles are derived. The sever 120 further selects cloth mesh fitted to the rigidbody mesh to determine whether the deformation of the cloth conforms to characteristics of the small deformation. When the cloth deformation conforms to the small deformation (i.e., the motion conforms to the condition of a linear elasticity system), the cloth mesh states are derived by the linear combination of the inflection points of the cloth. Moreover, if selected motion belongs to isotropic motion, the deformation results could be generated more precisely.

The deformation of the cloth with respect to the deformation of the rigidbody is estimated through the inflection points of the cloth by a physics engine. Physics methods (e.g., mass-spring system and finite element method) and the dynamic deformation model may be represented by equation (1) in an equilibrium state. Equation (1) shows a relationship of movement direction x in respect to external force, mass of internal mesh particle, damping parameter and status of force taken. Equation (1) calculates speed and location from the start to the end of deformation to obtain the deformation result of the cloth. Wherein x is location information of each particle under three dimensional space, x' and x" are first-order derivative and second-order derivative of x with respect to time, M is a mass matrix, C is a damping matrix, F(x) is force function of an elastic system, $f_{ext}$ is external force information, and $x_0$ is initial location information of each particle.

$$Mx''+Cx'+F(x-x_0)=f_{ext} \quad (1)$$

Regarding the location derivation, mathematical methods such as implicit integration are used to calculate location and speed information by equation (2) and equation (3). Wherein i is timeline information, $\Delta t$ is a time step, and v is velocity information of each particle.

$$x^{i+1}=x^i+\Delta t v^i \quad (2)$$

$$Mv^{i+1}=Mv^i+\Delta t(-Cv^{i+1}-F(x^{i+1}-x_0)+f_{ext}^{i+1}) \quad (3)$$

When a linear elastic system is determined by movement analysis of mesh face of the cloth, F(x) may be substituted by F=kx and make $f_{ext}$ equivalent to a linear algebra model for estimation. Therefore, when $f_{ext}$ is more similar to a linear status, the movement is more similar to the calculation result of physics engine.

In an embodiment, the mesh state transformation between inflection point of the cloth and inflection point of the rigidbody may be obtained by linear combination. When the mesh state transformation conforms to the small deformation, the error with respect to the actual mesh state is in a reasonable range. To improve the efficiency, inflection point states are classified into ID information stored in database for retrieval at any time.

Approximate motion functions of the cloth are established by linear combination of ID information and mesh states of the cloth. Matrix parameters of linear combination are further established according to the rigidbody type and stored in preprocessing storage and preprocessing database for coordination with FSM processing core.

Figure 7A:
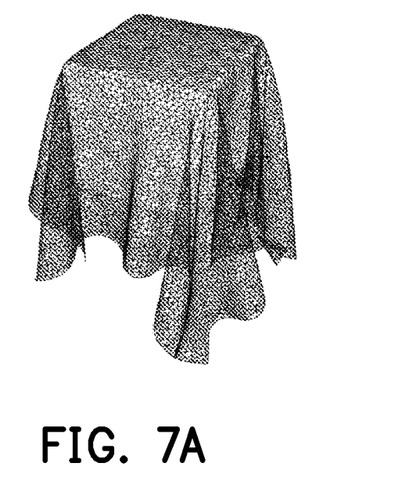
FIG. 7A-7D are diagrams illustrating deformation result of the cloth and the rigidbody according to an embodiment of the invention.
Figure 7B:
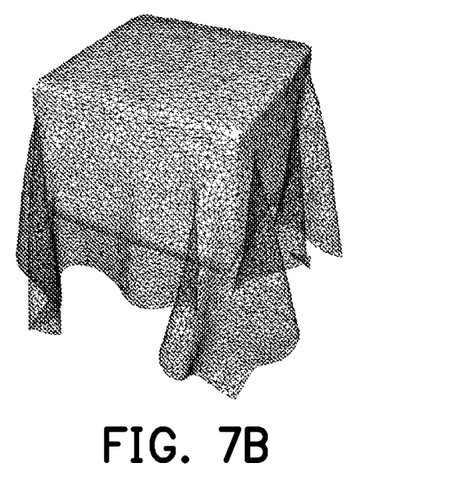
Figure 7C:
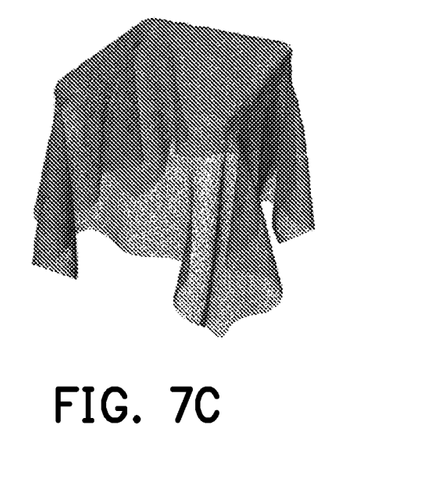
Figure 7D:
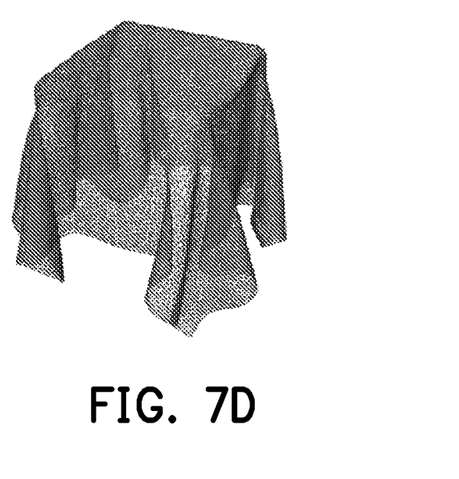

In FIG. 7A, mesh state $S_A$ shows mesh information of inflection point of the rigidbody and inflection point of the cloth in the preprocessing database. In FIG. 7B, mesh state $S_B$ shows mesh information of inflection point of the rigidbody and inflection point of the cloth in the preprocessing database. In order to derive a deformation results of cloth with respect to a rigidbody type between $S_A$ and $S_B$, the linear combination is used. In FIG. 7C, the rigidbody mesh state and cloth mesh state are calculated by the conventional physics method (e.g., finite element method). In order to obtain the cloth mesh state in the efficient way, the cloth deformation is derived by the linear combination which is established by the mesh states and corresponding inflection points. The cloth deformation result is shown in FIG. 7D. It can be shown that the physics approximation result of the cloth in FIG. 7D according to present disclosure is fairly close to the cloth mesh state in FIG. 7C.

Figure 8A:
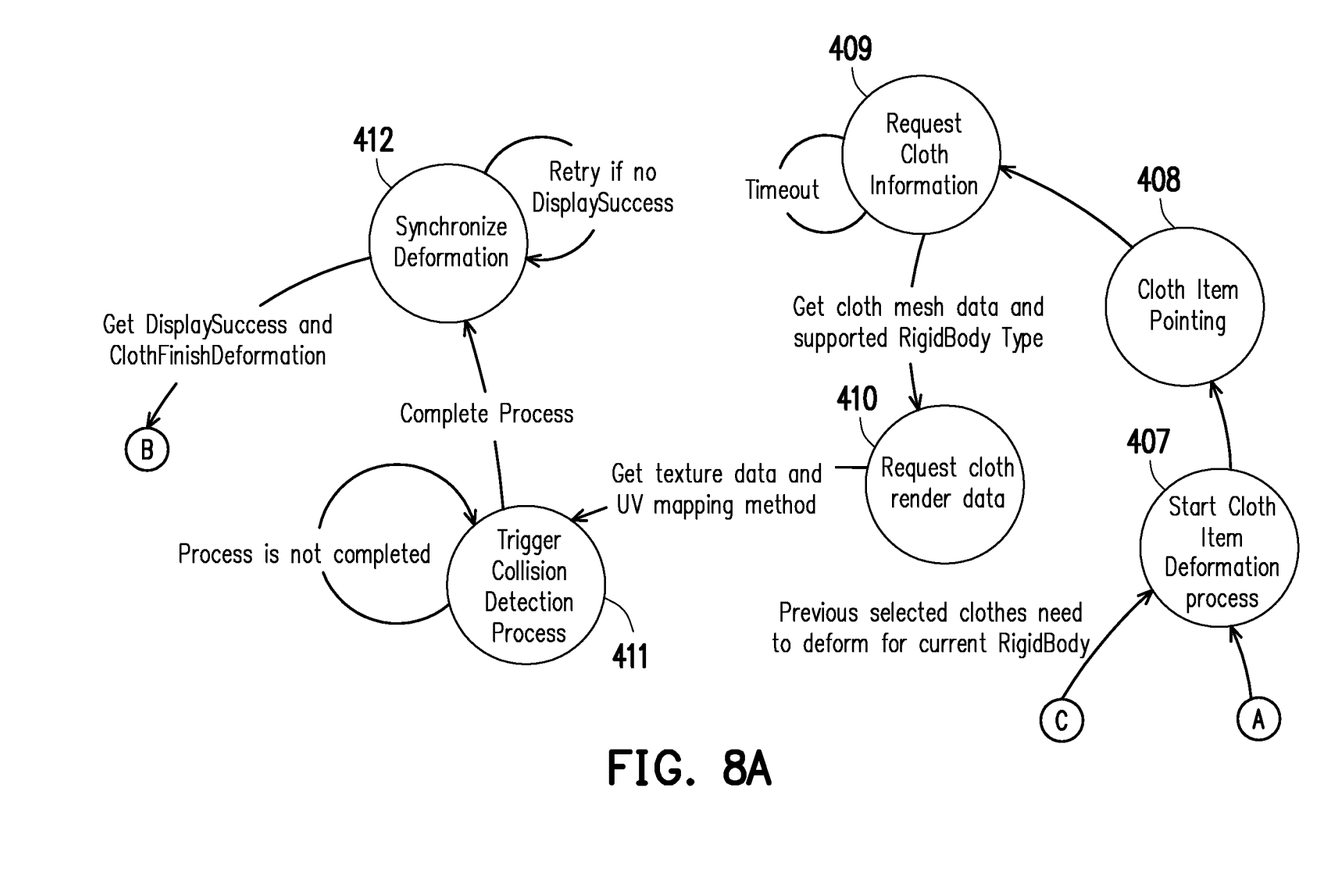
FIG. 8A and FIG. 8B are state diagrams illustrating the function of the FSM according to an embodiment of the invention.
Figure 8B:
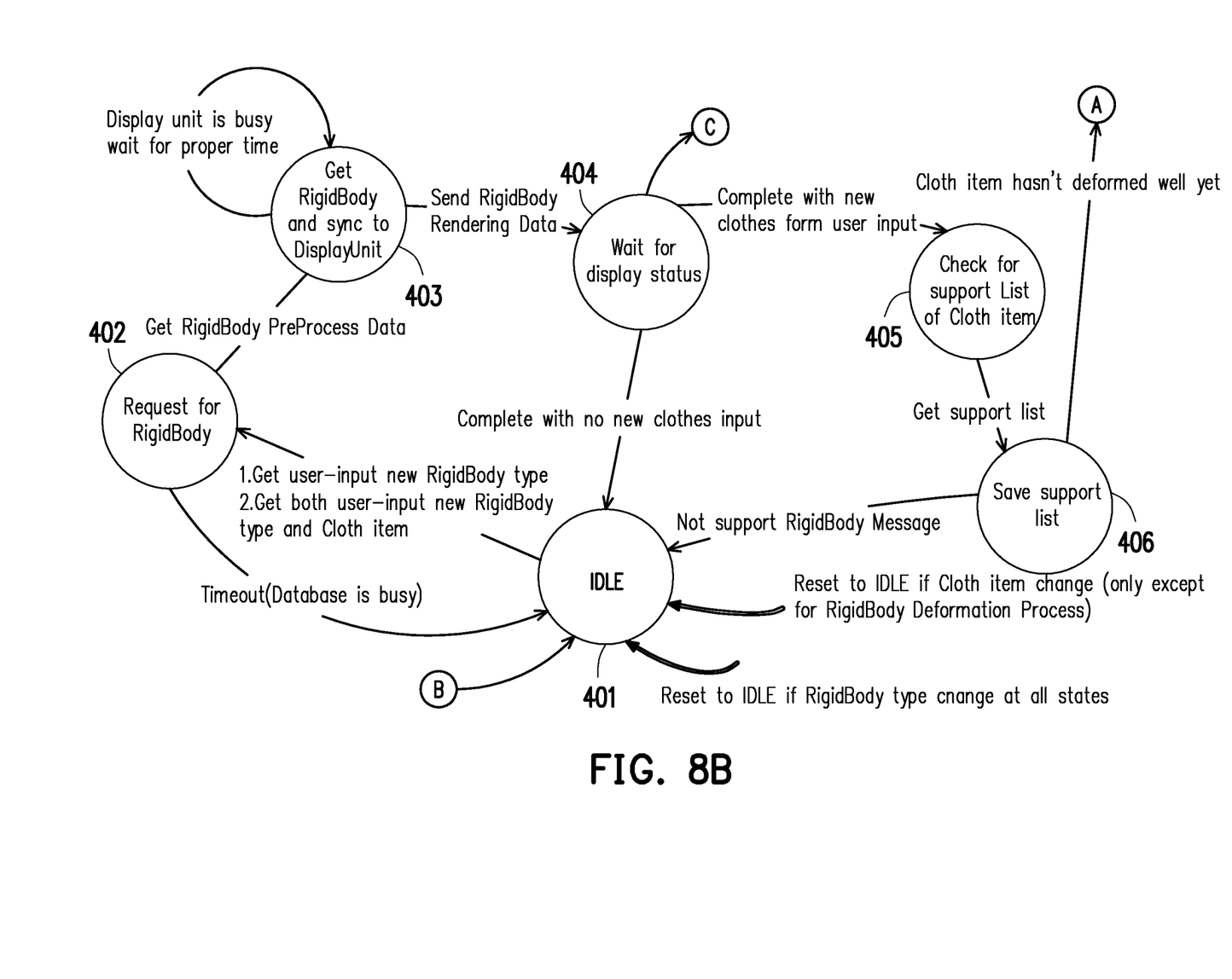

FIGS. 8A and 8B are state diagrams illustrating the function of the FSM according to an embodiment of the invention.

Referring to FIGS. 8A and 8B, IDLE 401 represents a state that current task is finished and waiting for a new event to trigger. Furthermore, if the user is adjusting the currently selected cloth item, the FSM 121 backs to IDLE 401. However, if the FSM 121 is performing a rigidbody type handling process when adjusting the currently selected cloth item, the FSM 121 does not back to IDLE 401. Moreover, when the user adjusts a setting of rigidbody type, the FSM 121 backs to IDLE 401 no matter which state the FSM 121 is in.

When the user sets a new rigidbody type or the user sets a new rigidbody and the cloth item, the FSM 121 enters Request for RigidBody 402 and generates an event of requesting for preprocessing information related to the rigidbody to the database 110. If the preprocessing information is successfully received from the database 110, the FSM 121 enters GetRigidBody and sync to DisplayUnit 403 or waits too long and triggers timeout and then sends a signal that rigidbody information cannot be accessed temporarily to the display unit 132 and enters IDLE 401.

If the display unit 132 functions accurately, Get Rigid-Body and sync to DisplayUnit 402 sends the rendering information of the rigidbody to the display unit 132 to display and gives a feedback for the user to confirm whether the mesh state of the rigidbody fits the need. If the display unit 132 is busy, the rendering information is sent once again.

After sending rendering information, Wait for display status 404 waits for the display unit 132 to report whether the operation is finished. If the operating is finished and the FSM 121 does not detect a new cloth item entered by the user, the FSM 121 is back to IDLE 401. If the operation is finished and the FSM 121 detects a new cloth item entered by the user, the FSM enters Check for support List of Cloth item 405. If the previously selected cloth item has not generated deformation corresponding to the rigidbody type, the FSM 121 enters Start Cloth Item Deformation process 407.

Check for support List of Cloth item 405 makes a request to the database 110 for user defined cloth item and obtains the information of whether the cloth supports the rigidbody types and enters the next state when receiving the message of whether the cloth supports the rigidbody types.

Save support list 406 stores support information in temporary storage space of the server 120. If the cloth has not finished the deformation process then the FSM 121 enters Start Cloth Item Deformation process 407.

The FSM 121 enters Start Cloth Item Deformation process 407 when the current cloth item requires further deformation to reflect the corresponding relationship with the rigidbody.

Cloth item pointing 408 defines mesh information processing target to cloth items which are not yet deformed and then enters Request Cloth Information 409.

Request Cloth Information 409 request for preprocessing information of the cloth according to the currently processing cloth item and obtains mesh information of the cloth and the supporting rigidbody type information. If the request triggers timeout, the request is resent until the requested information is successfully received.

Request cloth render data 410 make a request to the database 110 to obtain texture data and UV mapping method after receiving mesh information of the cloth.

Trigger Collision Detection Process 411 performs deformation prediction according to the collision detection mechanism and high poly mesh system. If the collision detection process is finished, the FSM 121 enters the next state to synchronize the deformation information to the display unit 132. If the collision detection process is not finished, the FSM 121 re-enters at the same state until the error of deformation result is small enough.

Synchronize Deformation 412 synchronizes rendering information to the display unit 132 and issues message of DisplaySuccess and ClothFinishDeformation and then enters IDLE 401. If FSM 121 does not receive DisplaySuccess message from the display unit 132, the FSM 121 performs a retry operation until receiving DisplaySuccess message.

Figure 9:
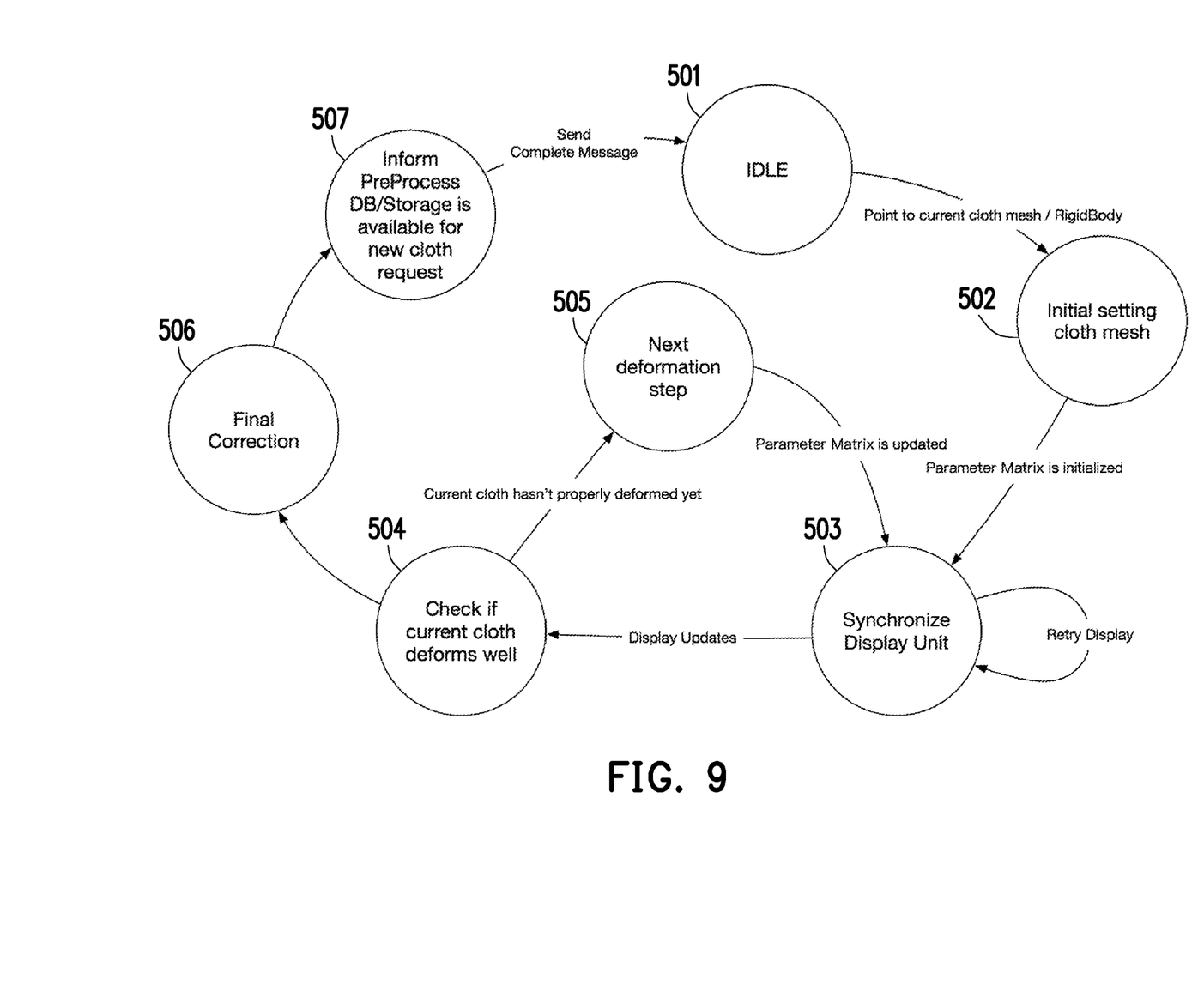
FIG. 9 is a state machine of collision detection process according to an embodiment of the invention.

FIG. 9 is a state machine of trigger collision detection process according to an embodiment of the invention.

Referring to FIG. 9, IDLE 501 is an idle mode of the trigger collision detection process state machine. When the FSM 121 triggers a cloth deformation event and requires the adjustment of the collision detection process, the FSM 121 enters Initial setting cloth mesh 502 and continue to define cloth and rigidbody of the current process to perform the following collision detection process.

Initial setting cloth mesh 502 performs initialization setting on the cloth item, sets an initial linear combination matrix parameter and cloth particle information, and synchronizes the information to the display unit 132.

Synchronize Display Unit 503 performs operation of synchronizing the display unit 132 after the linear combination matrix parameter is initialized or refreshed. If the display unit 132 cannot be synchronized, the retry display is performed. If display unit 132 is synchronized, the FSM goes to the next state.

Check if current cloth deforms well 504 ensures that the resulting deformation of the cloth and the rigidbody is within a predetermined range in a collision detection mechanism. If certain amount of collision or mesh overlap is detected, then further adjustment is required and the FSM 121 enters Next deformation step 505. If the collision situation is eliminated, the FSM 121 enters Final Correction 506.

Next deformation step 505 performs a single step adjustment mechanism to the linear combination matrix parameter and realizes the reservation of detail of physics system and cloth characteristic and updates mesh information of the cloth and synchronizes the updated mesh information to Synchronize Display Unit 503.

Final Correction 506 is entered when no collision is detected. Final Correction 506 performs minor adjustment of smooth trajectory for the cloth mesh information to be displayed close to natural rule such that the user experience is improved.

Inform Preprocess DB/Storage is available for new cloth request 507 sends a complete message to the preprocessing system after the collision process state machine back to IDLE 501.

Figure 10:
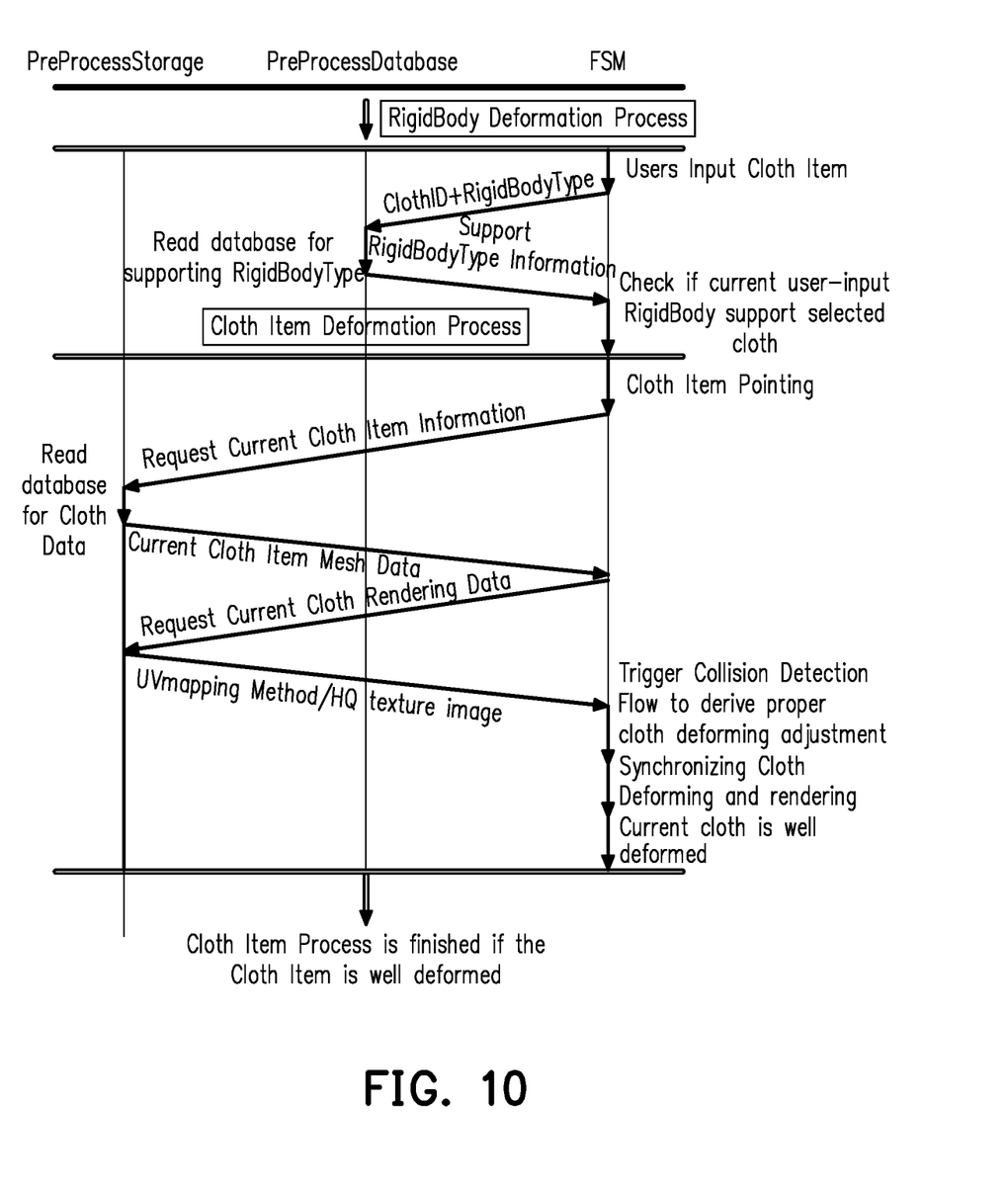
FIG. 10 is a handshake mechanism of FSM according to an embodiment of the invention.

FIG. 10 is a handshake mechanism of FSM according to an embodiment of the invention. Particularly, a handshake mechanism is performed between the FSM 121 and preprocessing database and preprocessing storage in the database 110.

Referring to FIG. 10, after the rigidbody deformation process, the FSM 121 receives a cloth item and a rigidbody type and transmits the cloth item information to the database 110 to search for supporting rigidbody types corresponding to the cloth item, and the FSM 121 determines whether the supporting rigidbody types includes the rigidbody type. It is worth noting that the preprocessing database is efficient for searching items and related information. The data in the preprocessing database is easy to update therefore the preprocessing database is easy to maintain. On the other hand, in the preprocessing storage, by referencing the information from preprocessing database and FSM data, the large asset files are proposed and served for user-defined functions. In an embodiment, the preprocessing database and the preprocessing storage may be implemented in the database 110.

In the cloth item deformation process, the FSM 121 sends a cloth item request to the database 110 to obtain mesh data of the cloth item, and the FSM 121 sends a cloth rendering request to the database to obtain a cloth rendering-related information. It is worth noting that the FSM 121 performs a collision detection according to the cloth mesh state and the rigidbody type.

Figure 11:
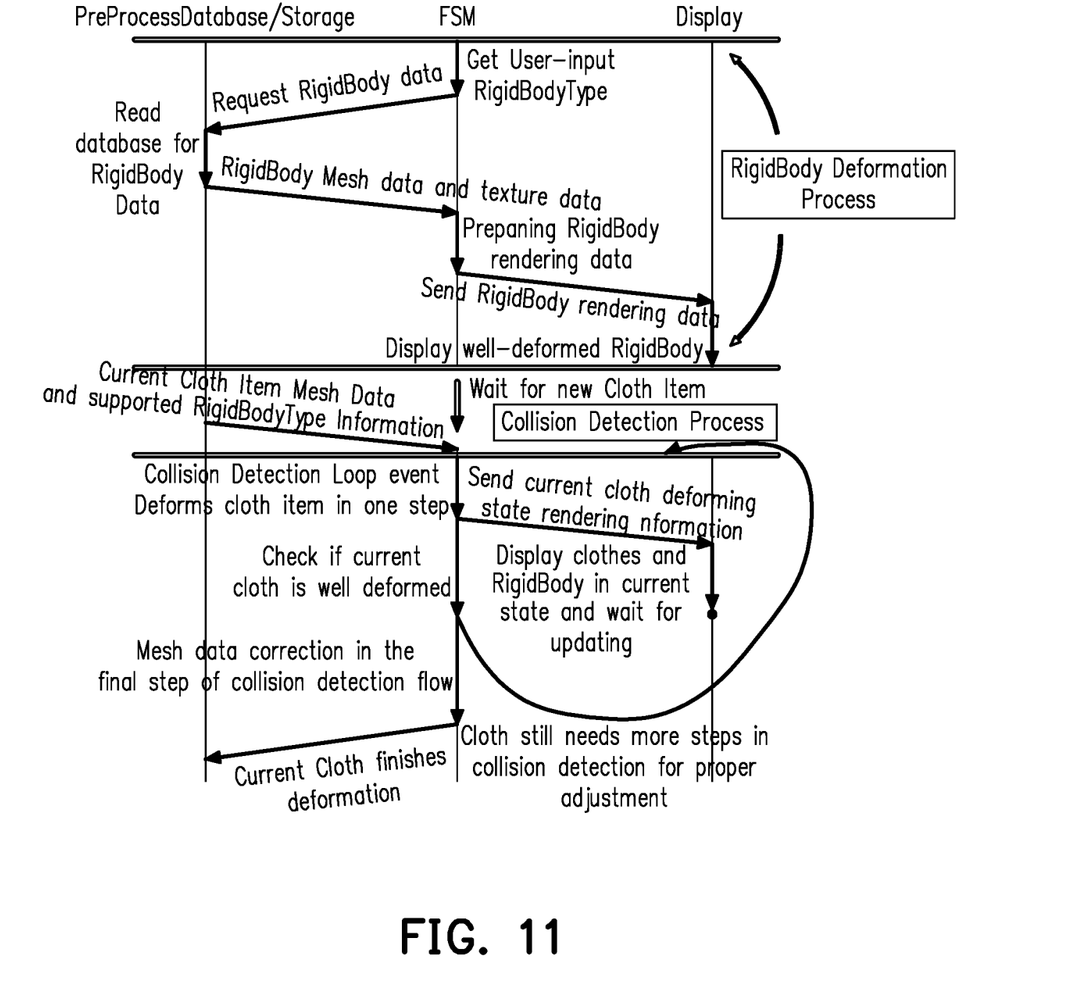
FIG. 11 is a handshake mechanism of collision detection process according to an embodiment of the invention.

FIG. 11 is a handshake mechanism of collision detection process according to an embodiment of the invention. Particularly, a handshake mechanism is performed between the FSM 121, the display unit 132 and the preprocessing database and preprocessing storage in the database 110.

Referring to FIG. 11, in the rigidbody deformation process, the FSM 121 receives a rigidbody type and sends a rigidbody data request to the database 110 to obtain mesh data of rigidbody type. The FSM 121 processes a rigidbody rendering data and sends the rigidbody rendering data to the user device 130 to display a well-deformed rigidbody on the user device 130.

In the collision detection process, the FSM 121 performs a collision detection to deform a cloth item and send rendering data of the deformed cloth item to the user device 130 to display the deformed cloth item. Furthermore, the FSM 121 determines whether the cloth item collides with the rigidbody, performs the collision detection to deform the cloth item when the cloth item collides with the rigidbody, and finishes the collision detection when the cloth item does not collide with the rigidbody.

In summary, the mesh rendering system, the mesh rendering method and the non-transitory computer readable medium of the present invention obtains the preprocessing data of a cloth and a rigidbody and stores the preprocessing data in the database. When a real-time input data of the user is received by the server, the server also receives the preprocessing data in the database to output a deformation result of the cloth and the rigidbody to the user device. Therefore, the computational cost of the user device is reduced and the user experience is improved under high frame rate displaying environment. Furthermore, the deformation estimation method of the present invention along with the integration of FSM core, preprocessing database and displaying mechanism optimizes the rendering result on the cross-platform web service.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A mesh rendering system, comprising:
   a database;
   a user device; and
   a server, coupled to the database and the user device, wherein
   the server obtains preprocessing data of a cloth and a rigidbody according to a mesh state of the cloth, a mesh state of the rigidbody and a motion of the rigidbody, wherein the cloth and the rigidbody are deformable and a motion of the cloth corresponding to the motion of the rigidbody is a small deformation, wherein the mesh state of the cloth comprises a plurality of particle information of the cloth and the mesh state of the rigidbody comprises a plurality of particle information of the rigidbody;

the server stores the preprocessing data in the database; and a finite state machine (FSM) of the server receives a real-time input data from the user device through a web service and the preprocessing data, and the finite state machine outputs a deformation result of the cloth and the rigidbody to the user device through a handshake mechanism.

2. The mesh rendering system according to claim 1, wherein the real-time input data comprises a rigidbody input information, a cloth input information and a motion input information, and the real-time input data triggers the FSM to start the handshake mechanism.

3. The mesh rendering system according to claim 2, wherein the rigidbody input information comprises a type and a material of the rigidbody, cloth input information comprises a type and a material of cloth, motion input information comprises one or more displacements of the rigidbody.

4. The mesh rendering system according to claim 1, wherein the server selects a plurality of mesh states of critical points of the cloth and the rigidbody, obtains an approximate motion function of the cloth by a linear combination of the mesh states, and stores the approximate motion function as the preprocessing data, wherein the critical points are inflection points of the cloth and the rigidbody and deformation of the cloth is calculated according to the mesh states via a physics engine.

5. The mesh rendering system according to claim 1, wherein the motion of the cloth is a small deformation when a value of a deformation function comprising a first parameter, a second parameter and a third parameter is less than a threshold, wherein the first parameter is a number of total mesh face of the cloth divided by a number of mesh faces of a contact area where the cloth contacting the rigidbody, the second parameter is an inverse of a number of mesh faces of an edge of the rigidbody, wherein the edge is parallel to a displacement direction of the rigidbody, and the third parameter is an absolute value of a displacement of the rigidbody, wherein the value is positively proportional to the first parameter, the second parameter and the third parameter.

6. The mesh rendering system according to claim 1, wherein the FSM receives a cloth item and a rigidbody type and transmits an information of the cloth item to the database to search for supporting rigidbody types corresponding to the cloth item, and the FSM determines whether the supporting rigidbody types comprises the rigidbody type.

7. The mesh rendering system according to claim 6, wherein the FSM sends a cloth item request to the database to obtain mesh data of the cloth item, and the FSM sends a cloth rendering request to the database to obtain a cloth rendering result, wherein the FSM performs a collision detection according to the cloth rendering result and the rigidbody type.

8. The mesh rendering system according to claim 1, wherein the FSM receives a rigidbody type and sends a rigidbody data request to the database to obtain mesh data of rigidbody type, wherein the FSM calculates a rigidbody rendering data and sends the rigidbody rendering data to the user device to display a deformed rigidbody on the user device.

9. The mesh rendering system according to claim 8, wherein the FSM performs a collision detection to deform a cloth item and send rendering information of the deformed cloth item to the user device to display the deformed cloth item, wherein the FSM determines whether the cloth item collides with the rigidbody, wherein the FSM performs the collision detection to deform the cloth item when the cloth item collides with the rigidbody, wherein the FSM finishes the collision detection when the cloth item does not collide with the rigidbody.

10. A mesh rendering method, comprising:

obtaining preprocessing data of a cloth and a rigidbody according to a mesh state of the cloth, a mesh state of the rigidbody and a motion of the rigidbody, wherein the cloth and the rigidbody are deformable and a motion of the cloth corresponding to the motion of the rigidbody is a small deformation, wherein the mesh state of the cloth comprises a plurality of particle information of the cloth and the mesh state of the rigidbody comprises a plurality of particle information of the rigidbody;

storing the preprocessing data in the database; and receiving a real-time input data from the user device through a web service and the preprocessing data, and outputs a deformation result of the cloth and the rigidbody to the user device through a handshake mechanism.

11. The mesh rendering method according to claim 10, wherein the real-time input data comprises a rigidbody input information, a cloth input information and a motion input information, and the real-time input data triggers a FSM to start the handshake mechanism.

12. The mesh rendering method according to claim 11, wherein the rigidbody input information comprises a type and a material of the rigidbody, cloth input information comprises a type and a material of cloth, motion input information comprises one or more displacements of the rigidbody.

13. The mesh rendering method according to claim 10, further comprising: selecting a plurality of mesh states of critical points of the cloth and the rigidbody, obtaining an approximate motion function of the cloth by a linear combination of the mesh states, and storing the approximate motion function as the preprocessing data, wherein the critical points are inflection points of the cloth and the rigidbody and deformation of the cloth is calculated according to the mesh states via a physics engine.

14. The mesh rendering method according to claim 10, the motion of the cloth is a small deformation when a value of a deformation function comprising a first parameter, a second parameter and a third parameter is less than a threshold, wherein the first parameter is a number of total mesh face of the cloth divided by a number of mesh faces of a contact area where the cloth contacting the rigidbody, the second parameter is an inverse of a number of mesh faces of an edge of the rigidbody, wherein the edge is parallel to a displacement direction of the rigidbody, and the third parameter is an absolute value of a displacement of the rigidbody, wherein the value is positively proportional to the first parameter, the second parameter and the third parameter.

15. The mesh rendering method according to claim 10, further comprising: receiving a cloth item and a rigidbody type and transmitting an information of the cloth item to the database to search for supporting rigidbody types corresponding to the cloth item, and determining whether the supporting rigidbody types comprises the rigidbody type.

16. The mesh rendering method according to claim 15, further comprising: sending a cloth item request to the database to obtain mesh data of the cloth item, and sending a cloth rendering request to the database to obtain a cloth rendering result; and performing a collision detection according to the cloth rendering result and the rigidbody type.

17. The mesh rendering method according to claim 10, further comprising: receiving a rigidbody type and sending a rigidbody data request to the database to obtain mesh data of rigidbody type; and calculating a rigidbody rendering data and sending the rigidbody rendering data to the user device to display a deformed rigidbody on the user device.

18. The mesh rendering method according to claim 17, further comprising: performing a collision detection to deform a cloth item and sending rendering data of the deformed cloth item to the user device to display the deformed cloth item;

determining whether the cloth item collides with the rigidbody;

performing the collision detection to deform the cloth item when the cloth item collides with the rigidbody; and finishing the collision detection when the cloth item does not collide with the rigidbody.

19. A non-transitory computer readable medium, storing a program causing a mesh rendering system to execute a process, the process comprising:

obtaining preprocessing data of a cloth and a rigidbody according to a mesh state of the cloth, a mesh state of the rigidbody and a motion of the rigidbody, wherein the cloth and the rigidbody are deformable and a motion of the cloth corresponding to the motion of the rigidbody is a small deformation, wherein the mesh state of the cloth comprises a plurality of particle information of the cloth and the mesh state of the rigidbody comprises a plurality of particle information of the rigidbody;

storing the preprocessing data in the database; and receiving a real-time input data from the user device through a web service and the preprocessing data, and outputs a deformation result of the cloth and the rigidbody to the user device through a handshake mechanism.

20. The non-transitory computer readable medium according to claim 19, wherein the real-time input data comprises a rigidbody input information, a cloth input information and a motion input information, and the real-time input data triggers a FSM to start the handshake mechanism, wherein the rigidbody input information comprises a type and a material of the rigidbody, cloth input information comprises a type and a material of cloth, motion input information comprises one or more displacements of the rigidbody, and the process further comprising: selecting a plurality of mesh states of critical points of the cloth and the rigidbody, obtaining an approximate motion function of the cloth by a linear combination of the mesh states, and storing the approximate motion function as the preprocessing data, wherein the critical points are inflection points of the cloth and the rigidbody and deformation of the cloth is calculated according to the mesh states via a physics engine, wherein the motion of the cloth is a small deformation when a value of a deformation function comprising a first parameter, a second parameter and a third parameter is less than a threshold, wherein the first parameter is a number of total mesh face of the cloth divided by a number of mesh faces of a contact area where the cloth contacting the rigidbody, the second parameter is an inverse of a number of mesh faces of an edge of the rigidbody, wherein the edge is parallel to a displacement direction of the rigidbody, and the third parameter is an absolute value of a displacement of the rigidbody, wherein the value is positively proportional to the first parameter, the second parameter and the third parameter.

* * * * *